United States Patent
Ersoy et al.

(10) Patent No.: US 7,045,999 B2
(45) Date of Patent: May 16, 2006

(54) RUBBER BEARING WITH A JOUNCE SENSOR

(75) Inventors: Metin Ersoy, Walluf (DE); Joachim Spratte, Osnabrück (DE); Bernd Grannemann, Hille (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 48 days.

(21) Appl. No.: 10/819,014

(22) Filed: Apr. 6, 2004

(65) Prior Publication Data

US 2004/0190805 A1    Sep. 30, 2004

Related U.S. Application Data

(63) Continuation of application No. PCT/DE03/01544, filed on May 14, 2003.

(30) Foreign Application Priority Data

May 15, 2002  (DE)  ................ 102 21 873

(51) Int. Cl.
   *G01B 7/30* (2006.01)

(52) U.S. Cl. ................ 324/207.25; 324/207.2; 324/207.21; 267/281; 280/124.177; 362/466

(58) Field of Classification Search ............ 324/207.11, 324/207.2, 207.21, 207.24, 207.25, 207.26, 324/207.23; 267/281, 279, 273, 282, 276, 267/292, 293; 340/440; 280/124.169, 124.177, 280/687, 124.134; 345/161; 262/466

See application file for complete search history.

(56) References Cited

U.S. PATENT DOCUMENTS

| | | | | |
|---|---|---|---|---|
| 4,168,840 A | * | 9/1979 | Graham ................ 280/6.157 |
| 4,838,563 A | | 6/1989 | Konishi et al. | |
| 4,857,841 A | * | 8/1989 | Hastings et al. ....... 324/207.21 |
| 5,264,790 A | * | 11/1993 | Moretti et al. ............ 324/174 |
| 5,275,429 A | * | 1/1994 | Bunker ................ 280/124.177 |
| 5,413,374 A | * | 5/1995 | Pierce ................ 280/124.77 |
| 5,767,767 A | * | 6/1998 | Lima et al. ............... 340/438 |
| 5,775,719 A | * | 7/1998 | Holden ................ 280/86.75 |
| 6,126,177 A | | 10/2000 | Steinert | |
| 6,234,654 B1 | * | 5/2001 | Okuchi et al. ........... 362/466 |
| 6,311,572 B1 | | 11/2001 | Gier | |
| 6,564,635 B1 | * | 5/2003 | Sherman et al. ............ 73/494 |
| 6,592,959 B1 | * | 7/2003 | Yamaguchi et al. ....... 428/66.6 |
| 2002/0097040 A1 | * | 7/2002 | Takizawa et al. ............ 324/174 |
| 2002/0121894 A1 | * | 9/2002 | Ooki et al. ............. 324/207.2 |

FOREIGN PATENT DOCUMENTS

DE            197 33 719 C1      4/1999

(Continued)

OTHER PUBLICATIONS

Hella KG, Feb. 1994, *Ein Berührungslos Messender Fahrzeugnivea-Usensor Von Hella, Automobiltech-Nische Zeitschrift*.

*Primary Examiner*—Bot Ledynh
*Assistant Examiner*—Kenneth J. Whittington
(74) *Attorney, Agent, or Firm*—McGlew & Tuttle, P.C.

(57) ABSTRACT

A bearing for a control arm of a wheel suspension of a vehicle has at least one sensor (18, 28, 38, 48, 58) arranged in or at the bearing (11, 21, 31, 41). The sensor determines the relative movement of the vehicle parts connected to each other by the bearing (11, 21, 31, 31, 41).

20 Claims, 5 Drawing Sheets

FOREIGN PATENT DOCUMENTS

| | | |
|---|---|---|
| DE | 197 54 524 A1 | 6/1999 |
| DE | 198 31 248 A1 | 1/2000 |
| EP | 0 617 260 A1 | 9/1994 |
| EP | 0617260 * | 9/1994 |
| GB | 2 229 006 A | 9/1990 |
| GB | 2229006 * | 12/1990 ............ 33/708 |
| JP | 07149130 * | 6/1995 |
| WO | WO 03/008819 A1 | 1/2003 |
| WO | WO 03/052284 A1 | 6/2003 |

* cited by examiner

RUBBER BEARING WITH A JOUNCE SENSOR

CROSS REFERENCE TO RELATED APPLICATION

This is a continuation of and claims the benefit (35 U.S.C. §120 and 365(c)) of copending International Application PCT/DE 03/01544 of May 14, 2003, which designated inter alia the United States and which claims the priority of German Application DE 102 21 873.0 of May 15, 2002. The entire contents of each application is hereby incorporated by reference in its entirety.

FIELD OF THE INVENTION

The present invention pertains to a bearing for a control arm of a wheel suspension of a motor vehicle.

BACKGROUND OF THE INVENTION

Headlight leveling, which detects the pitching of the vehicle from the jounce angle by means of sensors and adapts the position of the headlights by means of actuators, is necessary in modern vehicles, e.g., those equipped with xenon headlights. These sensors are installed as a separate assembly unit in the wheel housing and are connected to a control arm of the chassis by means of a linkage. The drawback of this is that the components used for this are relatively large and therefore require an unusually large space for their installation. Due to the system being arranged in the wheel housing, the system is susceptible to stone chips. Besides the great assembly effort, it is, furthermore, disadvantageous that this system must be adjusted in a plurality of individual steps in a complicated manner.

SUMMARY OF THE INVENTION

The basic object of the present invention is therefore to provide a simple possibility for detecting the jounce of a vehicle with simple means.

According to the invention, a bearing is provided for a control arm of a wheel suspension of a vehicle. At least one sensor arranged in or at the bearing determines the relative movement of the vehicle parts connected to each other by the bearing.

According to another aspect of the invention a system for determining the jounce of a vehicle is provided. The system includes a bearing provided for a control arm of a wheel suspension of a vehicle. At least one sensor arranged in or at the bearing determines the relative movement of the vehicle parts connected to each other by the bearing. A data processing unit is provided that calculates the jounce or rebound of at least one wheel or of a vehicle axle of the vehicle from the data of the sensor(s).

The basic inventive idea of the present invention is that at least one part of the vehicle that connects the wheel carrier with the body, for example, a strut or a control arm, is pivoted or moved during the jounce of the wheel of the vehicle or of the vehicle axle. The control arms are usually mounted on the body by means of rotary bearings, which may be designed especially as rubber bearings. According to the idea of the present invention, the pivoting movement of the control arm during the jounce and rebound can be determined directly by means of a sensor, which is arranged in or at the bearing, especially a rubber bearing. The bearing that is rigidly connected to the body is preferably selected here. The jounce and rebound determined at the bearing of the control arm can then be made available to the vehicle as information, e.g., for the dynamic headlight leveling. The value of the jounce is preferably determined in a contactless manner, as a result of which there will be no wear due to friction that would occur. Due to the integration of the sensor in the bearing, no separate housing is needed. However, it is, of course, possible to arrange the sensor in a separate housing and to connect it with the bearing. The means for determining the jounce may also be designed as a module, which can be arranged in the immediate vicinity of the bearing. Thus, a magnetic field generated by means of a magnet can be detected, for example, by means of a Hall sensor. However, an electric field or another field may also be used to determine the jounce.

The overall movement of the vehicle axle or of the vehicle wheel is perceived by the person steering the vehicle as a bounce and rebound of the wheel. Besides the pure jounce and rebound, rubber bearings, in particular, also permit angular movements along the other two space axes to a low extent. Furthermore, small thrust movements along the space axes are possible. Therefore, the disturbance variables occurring shall be taken into account when determining the pure jounce. For example, one sensor may be used to determine the ounce angle and an additional sensor or a plurality of additional sensors may be used to determine the disturbance variables. In case of a suitable arrangement and/or selection of the sensor or its design, it is, however, possible to exactly determine the jounce angle with only one sensor. The design of the bearing and/or the wheel suspension or the vehicle axle may also contribute to the minimization of the disturbance variable. A sensor that uses a variable to be sensed with a bipolar orientation is advantageously used. If, e.g., the zero position is to be determined with high accuracy, it is possible to use a Hall sensor and a biased magnetic field. The disturbance variables can now be compensated by a correspondingly strong zero field. For example, the dimensions of the magnet are markedly larger than the Hall IC itself in the case of the advantageous use of a Hall IC. Contrary to a Hall IC, magnetoresistive sensors detect only the direction of the field rather than the field intensity. This is advantageous for the detection of the jounce.

A plurality of possible embodiments of the idea of the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1A:
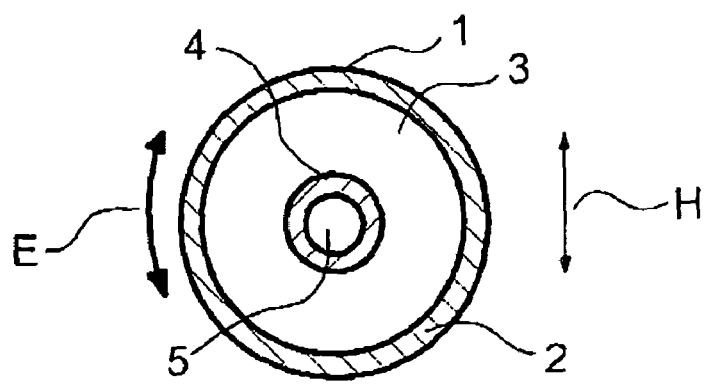
FIG. 1A is a sectional view of a rubber bearing according to the state of the art with indication of possible typical movements of the bearing.
Figure 1B:
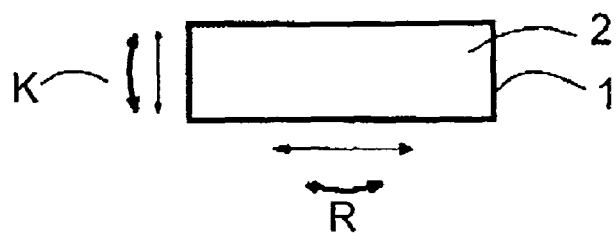
FIG. 1B is a top view of a rubber bearing according to FIG. 1A with an indication of possible typical movements of the bearing.

FIG. 1 shows a cross-sectional view as well as a top view of a rubber bearing 1 according to the state of the art. The rubber bearing 1 has an outer ring 2 as well as an inner ring 4, which are connected to one another by means of a rubber ring 3. The term ring shall not be interpreted too narrowly in the sense of the present invention, so that cross sections deviating from the circular shape are also possible. The outer ring 2 is fastened rigidly, for example, to the control arm of a vehicle, whereas the inner ring 4 surrounds, e.g., a part of the body of the motor vehicle by means of its cavity 5 and is rigidly connected to same. Because of the flexing movement of the rubber of the rubber bearing 3, the control arm, not shown, and the body, which is likewise not shown, may move in relation to one another in a certain range. The rubber bearing is usually fastened to the body such that the jounce of the vehicle brings about a twisting of the inner ring 4 in relation to the outer ring 2 and thus also a flexing movement of the rubber. The angular change occurring because of the jounce is indicated by the arrow E in FIG. 1.

Figure 2A:
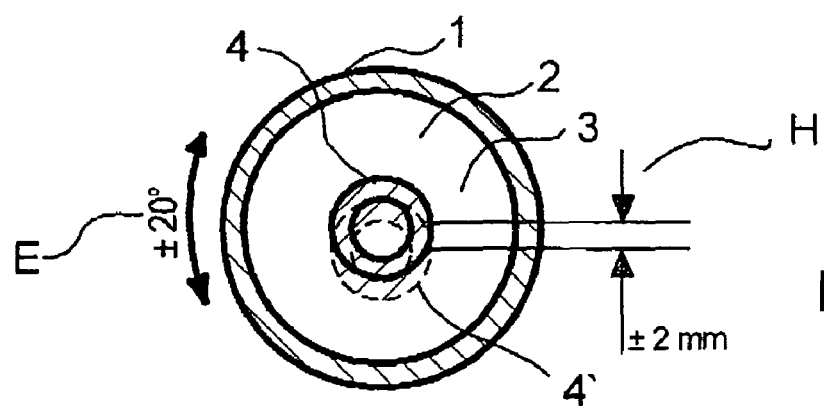
FIG. 2A is a sectional view of a rubber bearing in which only certain disturbance variables occur besides the jounce movement.
Figure 2B:
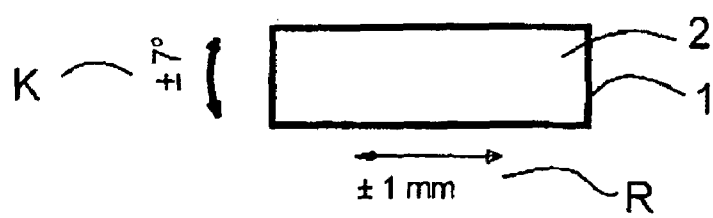
FIG. 2B is a top view of a rubber bearing of FIG. 2A in which only certain disturbance variables occur besides the jounce movement.

As can be seen in FIG. 2, the jounce and rebound (arrow E) from the zero position brings about, as a rule, a typical angular change by about ±20°. Besides the jounce movement, small thrust movements along the space axes are additionally possible as well. These are indicated by the arrows H, R and K and represent disturbing movements, which may possibly lead to errors in the measurement of the jounce angle. The disturbing movement H characterizes here the thrust movement in the vertical direction. The arrow direction R characterizes the thrust movement in the horizontal direction, and arrow K the cardanic movement, which may take place both around the vertical direction and around the horizontal direction. The vertical direction is defined here as a direction at right angles to the longitudinal axis of the bearing, and the horizontal direction designates a direction at right angles to the longitudinal axis and at right angles to the vertical direction. The longitudinal axis can be defined here as the central axis of the outer ring or of the inner ring. All disturbance variables can be detected directly by means of suitable sensors. However, this disadvantageously requires a large number of sensors, as a result of which the effort needed to determine the actual jounce and rebound is usually great. To rule out disturbance variables as much as possible, it is possible to use a sensor that can detect a field with a bipolar orientation. For example, a magnetic system as is shown in FIGS. 3 through 8 is suitable for this purpose.

However, it is also possible to provide optical, inductive or capacitive measurements for determining the jounce and rebound angles. However, magnetic systems are advantageous because of the simple design, the low maintenance effort as well as the robustness in respect to contamination. If the zero position is to be determined with a very high accuracy, a zero field sensing can be used, e.g., by means of a Hall IC in a biased magnetic field. A corresponding magnetic field of a magnet pole ring is shown in FIG. 8. However, some possible embodiments of the bearing according to the present invention shall be explained first on the basis of FIGS. 3 through 7.

Figure 3:
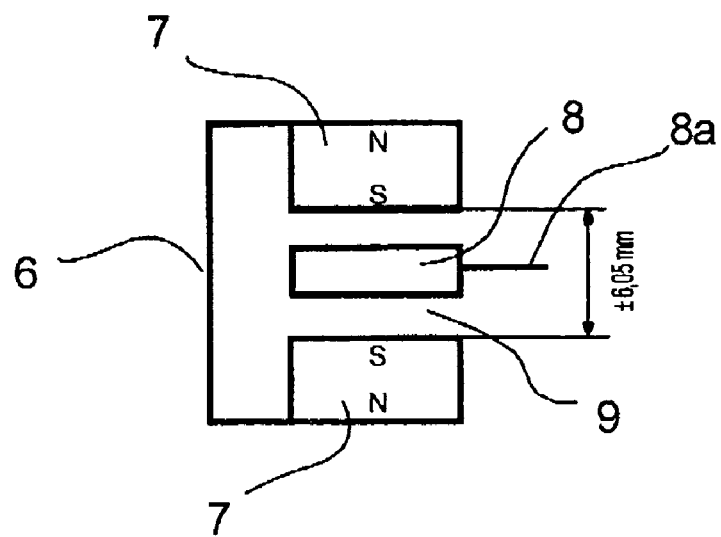
FIG. 3 is a a view showing a Hall sensor arranged centrally in a magnet pole ring for determining the jounce.

FIG. 3 shows an outer magnet arrangement 7, in the center of which a Hall sensor 8 with its connections 8a is arranged centrally. An air gap 9 is present between the magnets 7 of the magnet arrangement and the Hall sensor 8. The magnetic circuit is closed by a magnetic coupling 6 in the form of a metal pot. This metal pot may be fastened, e.g., to the outer ring of a rubber bearing, whereas the Hall sensor 8 is fastened to the inner ring of the rubber bearing. If the outer ring and the inner ring are moved, especially twisted, in relation to each other, the magnetic field will change in the area of the Hall sensor, which is detected by the Hall sensor 8 itself as a change in the magnetic field, whereupon the jounce angle E can be determined. A magnetic field, which increases, for example, toward the magnet poles, increasing, e.g., from 0, is generated between the magnets. If the Hall IC is fastened between the magnets such that it is located exactly in the zero field, a great change in the Hall voltage can be observed at the Hall sensor even during small movements of the Hall IC in relation to the magnets. This method is consequently outstandingly suitable for detecting small movements. The integration of such a sensor system is possible without problems even in the case of commercially available rubber bearings. Additional sensors may be provided to compensate errors of measurement caused by possible disturbing movements. For example, magnetoresistive sensors or Hall sensors may be arranged, e.g., at an angle of 90° in relation to one another in order to detect such disturbance variables.

Figure 4:
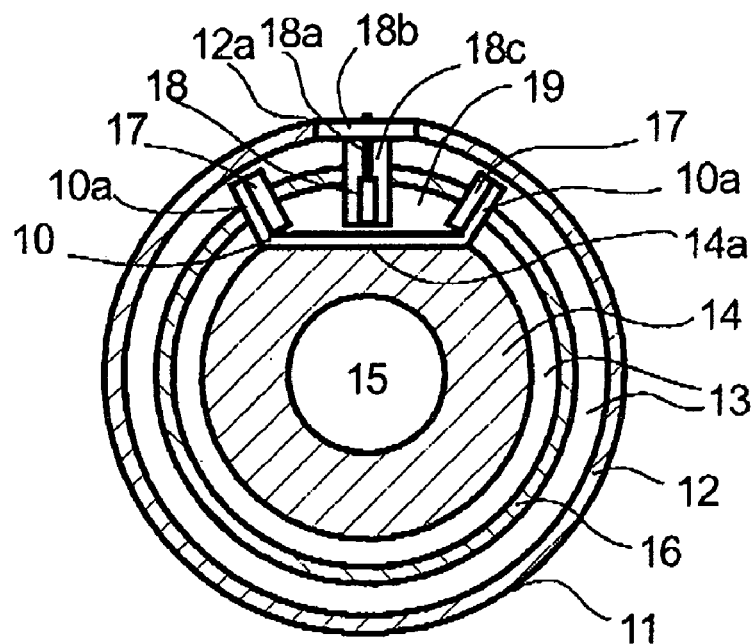
FIG. 4 is a sectional view showing a first possible embodiment of a bearing according to the present invention.

FIG. 4 shows a first possible embodiment 11 of a rubber bearing, in which an opening is milled on the top side, so that the inner ring 14 is exposed when viewed from the side. The inner ring 14 has an offset flat surface 14a, on which a fastening part 10, which carries a magnet 17 each with its free end 10a, is arranged rigidly. A Hall sensor 18, which is located between the magnets 17, is arranged at the outer ring 12 of the rubber bearing by means of a fastening means. If the inner ring 14 is twisted in relation to the outer ring 12, which twisting corresponds to a jounce or rebound, the Hall sensor 18 will move either to the left or right of magnet 17, as a result of which the magnetic field will change in the area of the Hall sensor 18. The change in the magnetic field is detected by means of a downstream electronic unit, which is not shown, whereby the jounce angle E can be determined from the signals of the sensor and can be made available to downstream systems of the motor vehicle. The recessed area of the rubber bearing 11 is sealingly closed by the holding device 18b, 18c for the Hall sensor 18, so that no dirt can enter the area of the sensor 18 and the magnets 17.

Figure 5:
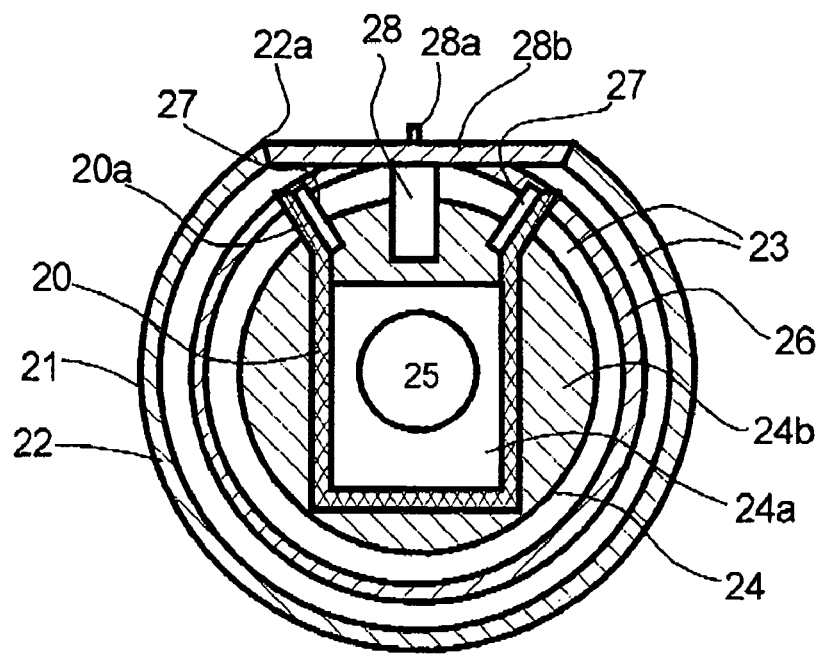
FIG. 5 is a sectional view showing a second possible embodiment of a bearing according to the present invention.

FIG. 5 shows a second possible embodiment of a rubber bearing 21, which has a design similar to that of the rubber bearing 11 according to FIG. 4. However, the sensor 28 as well as the magnets 27 are arranged on the front side of the rubber bearing 21. Thus, a cuboid block 24a, which projects over the front side 24b of the inner ring 24, is led out of the inner ring 24, which has a circular profile, on its front side.

The shape of the led-out area of the inner ring may, of course, be selected as desired. This cuboid projection 24a is surrounded by a holding device 20, at the free ends 20a of which the magnets 27 are arranged. The free ends 20a of the holding device 20 project over the cuboid projection 24a, so that the sensor 28, which is fastened to the outer ring 22 of the rubber bearing 21 by means of a holding device 28b, can be arranged between the magnets 27. The space for the magnets 27 as well as for the sensor 28 may be prepared by milling out the stabilizing intermediate ring 26 as well as the inner ring 24 and the rubber rings 23. It is conceivable that no additional holding device 28b, to which the sensor 28 is fastened, is provided. The outer ring 22 may rather be used to fasten the sensor 28 directly or via additional intermediate parts.

Figure 6:
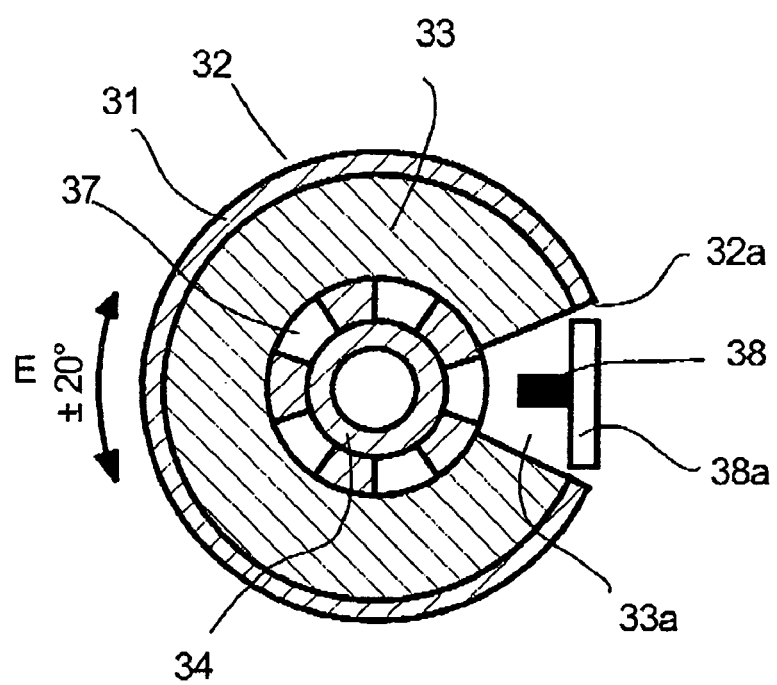
FIG. 6 is a sectional view showing a third possible embodiment of a bearing according to the present invention.

FIG. 6 shows a third possible embodiment of a rubber bearing for determining the depth of jounce of the motor vehicle by means of a magnetoresistive sensor. A magnet pole ring 37, comprising an alternating sequence of radially and centripetally oriented magnets, is fastened to this rubber bearing 31 at the inner ring 34, and the orientation of each of the magnets is directed, starting from the north pole of the magnet, in the direction of the south pole of the magnet. The sensor 38 is fastened to the outer ring 32 of the rubber bearing 31 by means of a fastening device 38a. If the inner ring 34 is twisted in relation to the outer ring 32 and the rubber ring 33 is flexed, the magnetic field will change in the area of the sensor 38, and the height E of the jounce or the jounce angle E can thus be determined. If the magnet pole ring 37 is arranged in the axial center of the rubber bearing 31, it is necessary to remove the rubber ring 33 as well as the outer ring 32 at least partially to install the sensor 38. If, by contrast, the magnet pole ring 37 is arranged on the front side of the rubber bearing 31, the sensor 38 may likewise be arranged on the front side of the outer ring 32.

It is, of course, possible to provide a cover or a housing, which protects the sensor unit from dirt and mechanical damage, in all the possible embodiments described in this application, in which the magnets and the sensor are arranged on the front side of the bearing.

Figure 7:
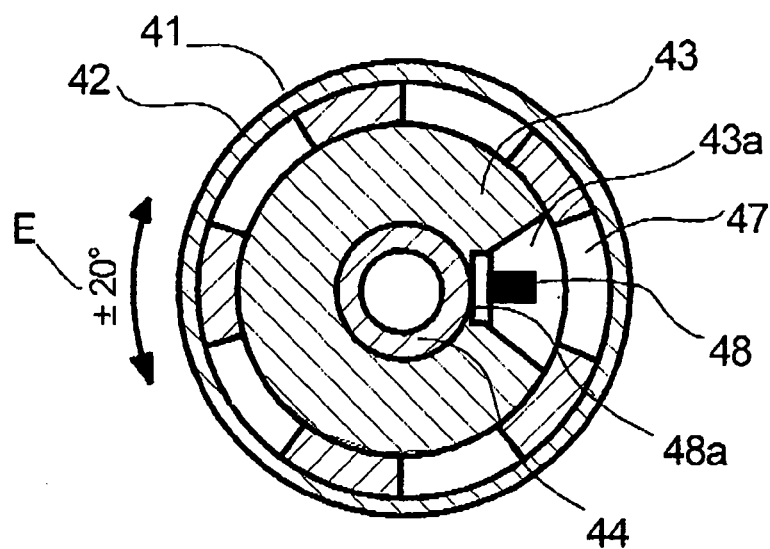
FIG. 7 is a sectional view showing a fourth possible embodiment of a bearing according to the present invention.
Figure 8:
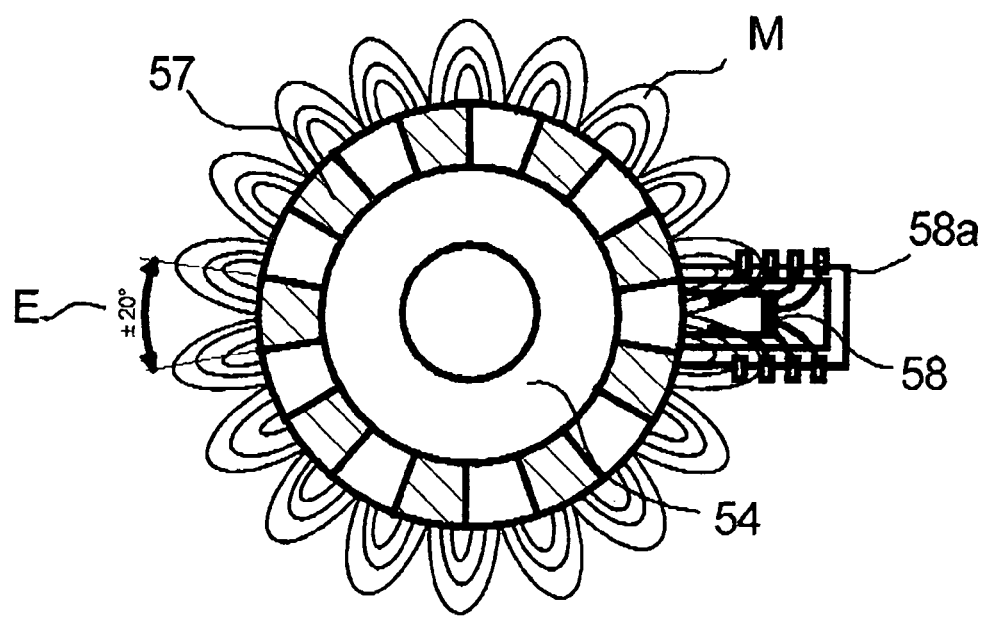
FIG. 8 is a schematic view of the detection of the magnetic field of a magnet pole ring by means of a magnetoresistive sensor.

FIG. 7 shows another possible embodiment of a rubber bearing 41, in which the magnetoresistive sensor 48 is arranged at the inner ring 44 of the rubber bearing, whereas a magnet pole ring 47 is arranged at the outer ring 42. The twisting of the outer ring in relation to the inner ring is then determined by means of the changing magnetic field in the area of the magnetoresistive sensor 48 in the manner explained above.

FIG. 8 shows possible magnetic field lines M of a magnet pole ring 57, which is fastened to an inner ring 54 of a rubber bearing. A magnetoresistive sensor (MRS) 58 is arranged in the area of the magnetic field M and is rigidly connected to the outer ring (not shown) of the bearing. The magnet pole ring 57 moves in relation to the MRS during the jounce of the motor vehicle, and it becomes clear that the magnetic field will now change in the area of the MRS because of the relative movement. The MRS 58 itself is electrically connected via connections 58a to a downstream electronic unit. If the MRS 58 is selected suitably, angular movements of considerably less than 1 degree can be detected with certainty, and accurate determination of the jounce angle is possible.

Figure 9:
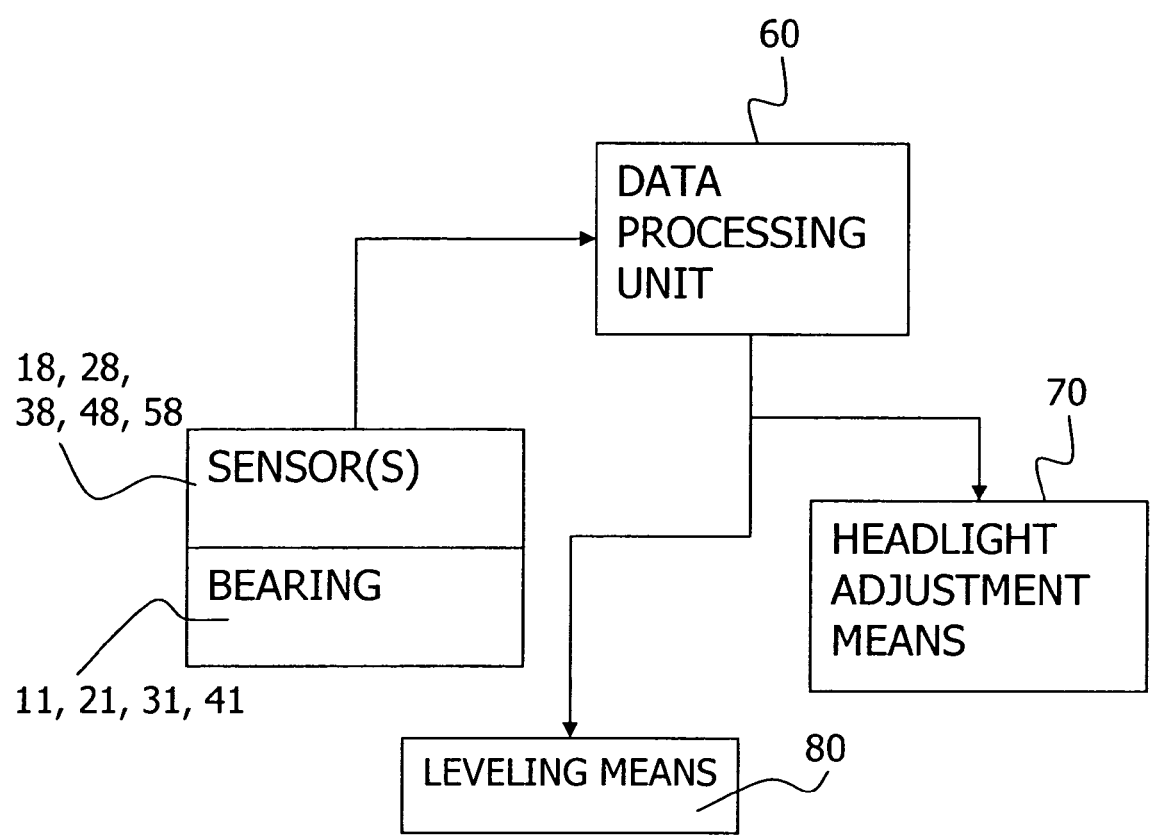
FIG. 9 is a schematic view of the system according to the invention.

FIG. 9 is a schematic view showing the sensor 18, 28, 38, 48, 58 arranged in or at the bearing 11, 21, 31, 41 to determine the relative movement of the vehicle parts connected to each other by the bearing. A system is provided for determining the jounce of a vehicle with the use of the bearing 11, 21, 31, 41 and with the sensor 18, 28, 38, 48, 58 connected to the data processing unit 60. The data processing unit 60 calculates the jounce or rebound of at least one wheel or of a vehicle axle of the vehicle from the data of the sensor(s) 18, 28, 38, 48, 58. The amount of the jounce is used to set the height of the headlight via headlight adjustment means 70 of the vehicle and/or to level the vehicle via leveling means 80, based on the calculation by data processing unit 60.

It is obvious that both the sensor and the magnets or the magnet pole ring may be arranged in a modular manner on existing rubber bearings, in which case corresponding fastening devices or means are to be provided, so that the magnets as well as the sensor can be fastened to the outer ring and the inner ring of the rubber bearing. If an intermediate ring 16, 26 is provided, it is, of course, also possible to fasten or arrange the magnets or the MRS on this intermediate ring as well. However, it is meaningful to select the parts of the bearing that perform the greatest relative movements in relation to one another.

The idea of the present invention covers, in principle, all types of bearings. However, the idea of the present invention was described and explained on the basis of rubber bearings only as an example due to the wide use of rubber bearings.

While a specific embodiment of the invention has been shown and described in detail to illustrate the application of the principles of the invention, it will be understood that the invention may be embodied otherwise without departing from such principles.

What is claimed is:

1. A bearing for a control arm of a wheel suspension of a vehicle, the bearing comprising:
    a bearing structure including an inner and outer ring with a rubber ring arranged between said inner and outer ring to form a rubber bearing, said bearing structure having a magnet pole ring; and
    a sensor arranged in or at the bearing structure for determining a relative movement of vehicle parts connected to each other by the bearing structure, said sensor being spaced by a radial distance from a center axis of said outer ring, a magnetic field of said magmatic pole ring is detected by said sensor or by a magnetic field sensor portion of said sensor.

2. A bearing in accordance with claim 1, wherein said sensor determines the twisting and determines the relative displacement of the vehicle parts connected to each other by the bearing.

3. A bearing in accordance with claim 1, further comprising magnets wherein said sensor is arranged centrally between at least two said magnets.

4. A bearing in accordance with claim 3, wherein the poles of said two said magnets have the same direction face each other.

5. A bearing in accordance with claim 1, wherein the sensor is a magnetoresistive sensor or a Hall sensor.

6. A bearing in accordance with claim 1, wherein a movement of said bearing is determined by said sensor capacitively or inductively.

7. A bearing in accordance with claim 1, further comprising a housing fastened to the bearing structure, wherein said sensor is arranged in said housing.

8. A bearing in accordance with claim 1, further comprising:
    a data processing unit calculating the jounce or rebound of at least one wheel or of a vehicle axle of the vehicle from the data of said sensor.

9. A bearing in accordance with claim 8, wherein the amount of the jounce is used to set the height of the headlight of the vehicle and/or to level the vehicle.

10. A bearing in accordance with claim 1, wherein:
said sensor is integrated in said rubber bearing.

11. A bearing in accordance with claim 1, wherein:
said sensor is arranged at said outer ring.

12. A bearing in accordance with claim 11, wherein:
said two magnets are arranged at said inner ring;
said sensor is arranged between said two magnets.

13. A bearing in accordance with claim 12, wherein:
said two magnets are arranged at a radial distance from a center axis of said inner ring.

14. A bearing in accordance with claim 13, wherein:
said two magnets have magnetic poles, said two magnets are arranged to create a magnetic field with a strength that increases toward said magnetic poles.

15. A bearing in accordance with claim 13, further comprising:
a holding device connecting said sensor to said outer ring;
a fastening part connecting said two magnets to said inner ring, said fastening part including free ends, said two magnets being arranged on said free ends.

16. A bearing in accordance with claim 15, wherein:
said inner ring has a substantially flat surface, said fastening part is rigidly arranged on said substantially flat surface.

17. A bearing for a control arm of a wheel suspension of a vehicle, the bearing comprising:
a bearing structure including a rubber bearing having an outer ring, an inner ring and a magnet pole ring, said magnetic pole ring being one of fastened to said inner ring or forming the inner ring itself;
a sensor arranged in or at the bearing structure for determining a relative movement of vehicle parts connected to each other by the bearing structure, a magnetic field of said magnet pole ring is detected by said sensor or by a magnetic field sensor portion of said sensor.

18. A bearing for a control arm of a wheel suspension of a vehicle, the bearing comprising:
a bearing structure including a rubber bearing having an outer ring, an inner ring and a magnet pole ring, said magnetic pole ring being one of fastened to said outer ring of said rubber bearing directly, fastened via an intermediate part or forming said outer ring;
a sensor arranged in or at the bearing structure for determining a relative movement of vehicle parts connected to each other by the bearing structure, a magnetic field of said magnet pole ring is detected by said sensor or by a magnetic field sensor portion of said sensor.

19. A vehicle suspension arrangement comprising:
an outer ring;
an inner ring arranged inside said outer ring;
an elastic ring arranged between said outer and said inner ring to flex when said outer ring rotates with respect to said inner ring;
a sensor arranged on one of said inner and outer rings and sensing relative movement of said inner and outer rings, an entirety of said sensor being spaced by a radial distance from a center axis of said outer ring.

20. A bearing for a control arm of a wheel suspension of a vehicle, the bearing comprising:
a bearing structure including an inner and outer ring with a rubber ring arranged between said inner and outer ring to form a rubber bearing;
at least two magnets in or at said bearing structure, poles of said two said magnets having the same direction facing each other; and
a sensor arranged in or at the bearing structure and arranged centrally between said at least two said magnets for determining a relative movement of vehicle parts connected to each other by the bearing structure, said sensor being spaced by a radial distance from a center axis of said outer ring.

* * * * *